United States Patent [19]

Day

[11] 4,293,026

[45] Oct. 6, 1981

[54] ENERGY CONSERVER

[76] Inventor: Jerome A. Day, 14205 Les Palms Cir., No. 3, Lutz, Fla. 33549

[21] Appl. No.: 101,835

[22] Filed: Dec. 10, 1979

[51] Int. Cl.³ .......................................... G05D 23/00
[52] U.S. Cl. ......................................... 165/11; 236/47
[58] Field of Search ................. 165/11, 27; 236/47; 307/116; 200/61.62, 61.66

[56] References Cited

U.S. PATENT DOCUMENTS

| | | | |
|---|---|---|---|
| 4,058,740 | 11/1977 | Dalton et al. | 307/116 |
| 4,060,123 | 11/1977 | Hoffman et al. | 165/11 |
| 4,091,866 | 5/1978 | Curatolo | 165/138 |
| 4,101,886 | 7/1978 | Grimes et al. | 165/14 |
| 4,232,819 | 11/1980 | Bost | 236/47 |

*Primary Examiner*—William E. Wayner
*Attorney, Agent, or Firm*—Arthur W. Fisher, III

[57] ABSTRACT

An energy conserver for use with a heating and air conditioning unit comprising a three position lock switch selectively moveable between a first, second and third position and a thermostatic control unit including a cooling control switch and a heating control switch each selectively moveable between a first and second position such that the heating and air conditioning unit operates continuously in the cooling mode and heating mode when the three position lock switch is in the first and third position respectively and selectively operates in the cooling or heating mode when within either of two preselected temperature ranges.

1 Claim, 1 Drawing Figure

ENERGY CONSERVER

BACKGROUND OF THE INVENTION

1. Field of the Invention

An energy conserver for use with a heating and air conditioning unit comprising a lock switch and thermostatic control unit to selectively control the operation of the heating and air conditioning unit.

2. Description of the Prior Art

Typically in the hotel and motel industry guests adjust the heating and air conditioning unit to operate even in their absence from the room. As a result energy expended to heat or cool is often wastefully used.

Thus a means capable of controlling the operation of the heating and air conditioning unit in the absence of the guest would be useful in conserving energy. One such means would be to provide a lock type switch to control the operation. Examples of electric lock switches are disclosed in U.S. Pat. No. 1,290,233 and 1,334,292. Unfortunately these disclosures fail to teach a means of fully controlling the room environment, particularly when the guest is absent from the room.

SUMMARY OF THE INVENTION

The present invention relates to an energy conserver for use with a heating and air conditioning unit to selectively control the operation of the heating and air conditioning unit. More specifically, the energy conserver comprises an electric lock switch to curtail the operation of the heating and air conditioning unit when a motel or hotel guest is not in the room thereby saving electric power. The guest disenables the energy conserver from its normal operation. The heating unit will be energized when the temperature falls below a preselected temperature such as 57° F. Subsequently when the room temperature is raised to 59° F., the heating unit will automatically shut off. Alternately the cooling unit will be energized when the room temperature rises above 82° F. When the room temperature subsequently cools to 78° F. the cooling unit will automatically be shut off. These cycles will repeat so that temperature in the room will never rise above 82° F. or below 57° F. or other preselected temperatures.

The energy conserver comprises a three position lock switch having a first, second, and third position and a thermostatic control unit including a cooling and heating control switch.

Normally when the guest is absent from the room the three position lock switch is in the second position such that power is fed through the cooling and heating control switches. The cooling and heating control switches respectively may comprise bimetalic thermostat or other temperature control actuator switch such that the heating and cooling conditioning unit will operate in the cooling or heating mode within preselected ranges as previously described. When the guest enters the room he inserts his room key into key-way or slot to control the three position lock switch. Specifically to operate the heating mode the switch is moved to the third position such that electric power is fed to the heating and air conditioning unit 12 for operation and control under the control panel. Similarly to operate the cooling mode, the switch is moved to the first position such that electric power is fed to the heating and air conditioning unit for operation for under the control of control panel.

The key may only be withdrawn when in the second position in any conventional type lock. Removal of the key is necessary in that it corresponds and is used to open the room door, itself.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
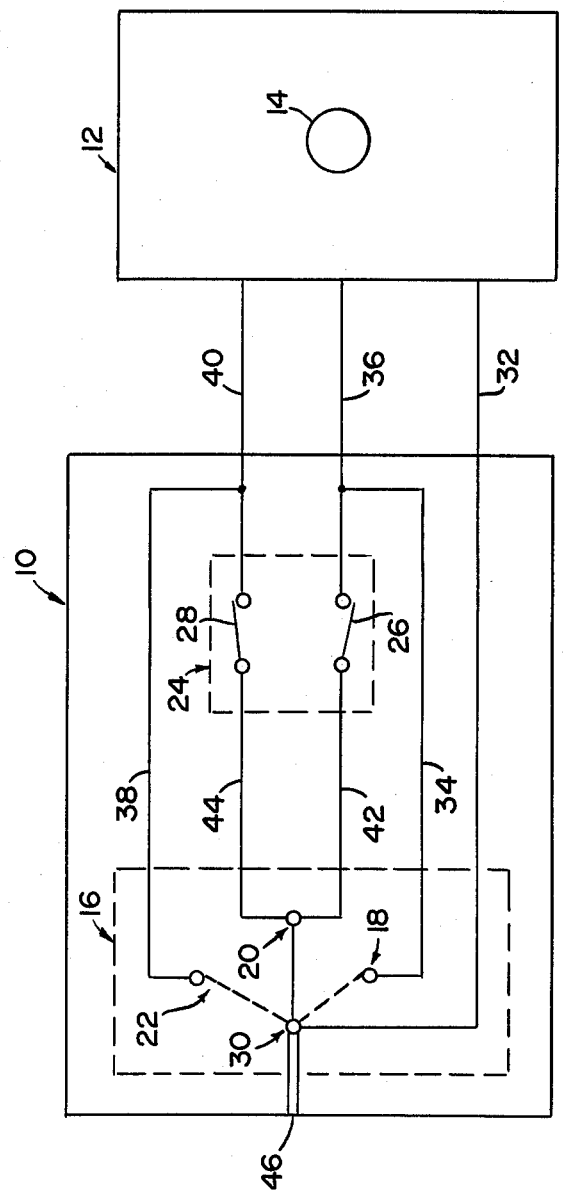
FIG. 1 is a detailed schematic of the energy conserver.

As shown in FIG. 1, the present invention relates to an energy conserver generally indicated as 10 for use with a heating and air conditioning unit 12 to selectively control the operation of the heating and air conditioning unit 12. More specifically, the energy conserver 10 comprises an electric lock switch to curtail the operation of the heating and air conditioning unit 12 when a motel or hotel guest is not in the room thereby saving electric power. As more fully described hereinafter this is accomplished by requiring the room key to be inserted into the energy conserver 10 to enable the guest to maintain control over the heating and air conditioning unit 12 through the use of the normal control panel generally indicated as 14. Upon removal of the room key from the energy conserver 10 the guest leaves the room thereby disenabling the normal operation of the heating and air conditioning unit 12. That is, the heating and air conditioning modes will be totally inoperative when the guest is not in the room. Alternately the heating unit will be energized when the temperature falls below a preselected temperature such as 57° F. Subsequently when the room temperature is raised to 59° F., the heating unit will automatically shut off. Alternately the cooling unit will be energized then the room temperature rises above 82° F. When the room temperature subsequently cools to 78° F. the cooling unit will automatically be shut off. These cycles will repeat so that temperature in the room will never rise above 82° F. or below 57° F. or other preselected temperatures. The energy conserver 10 may be conveniently mounted alongside the heating and air conditioning unit 12 easily accessible and convenient to the guest.

As shown in FIG. 1, the energy conserver 10 comprises a three position lock switch generally indicated as 16 having a first, second and third position indicated as 18, 20 and 22 respectively and a thermostatic control unit generally indicated as 24 including a cooling control switch 26 and heating control switch 28. The base 30 of three position lock switch 16 is coupled to the electric source through the heating and air conditioning unit 12 by conductor 32. The first position 18 is coupled to the heating and air conditioning unit 12 through conductors 34 and 36 in series while the third position 22 is coupled to the heating and air conditioning unit 12 through conductors 38 and 40 in series.

The second position 20 is coupled to the cooling control switch 26 and heating control switch 28 through conductors 42 and 44 respectively. The entire unit 10 is enclosed within a cabinet including a key-way or slot 46 disposed in the forward portion thereof to receive a control key to selectively move the three position lock switch 16 as more fully described hereinafter.

Normally when the guest is absent from the room the three position lock switch is in the second position 20 such that power is fed through conductor 32 to base 30 and thence to the cooling and heating control switches 26 and 28 through conductors 42 and 44 respectively. The cooling and heating control switches 26 and 28 respectively may comprise bimetallic thermostat or other temperature control actuator switch such that the heating and cooling conditioning unit 12 will operate in the cooling or heating mode with preselected ranges as previously described. When the guest enters the room he inserts his room key into key-way or slot 46 to control the three position lock switch 16. Specifically to operate the heating mode the switch 16 is moved to the third position 22 such that electric power is fed through conductor 32, base 30, third position 22, conductors 38 and 42 to the heating and air conditioning unit 12 for operation and control under control panel 14.

Similarly to operate the cooling mode, the switch 16 is moved to the first position 18 such that electric power is fed through conductor 30 to base 30, first position 18, conductors 34 and 36 to the heating and air conditioning unit 12 for operation for under the control of control panel 14.

The key may only be withdrawn when in the second position in any conventional type lock. Removal of the key is necessary in that it corresponds and is used to open the room door itself.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An energy conserver for use with a heating and air conditioning unit, said energy conserver comprising a three position lock switch electrically coupled to the heating and air conditioning unit, selectively moveable between a first, second and third position and a thermostatic control unit including a cooling control switch and a heating control switch electrically coupled between the heating and air conditioning unit and said third position lock switch, each said cooling control switch and heating conditioning control switch selectively moveable between a first and second position such that the heating and air conditioning unit operates continuously in the cooling mode and heating mode when the three position lock switch is in said first and third position respectively and selectively operates in the cooling or heating mode when within either of two preselected temperature ranges when in said second position.

* * * * *